(12) United States Patent
Nawrocki

(10) Patent No.: US 9,704,080 B2
(45) Date of Patent: Jul. 11, 2017

(54) SECURITY ELEMENT FOR SENSITIVE DOCUMENTS AND A SENSITIVE DOCUMENT

(71) Applicant: Piotr Nawrocki, Inowroclaw (PL)

(72) Inventor: Piotr Nawrocki, Inowroclaw (PL)

( * ) Notice: Subject to any disclaimer, the term of this patent is extended or adjusted under 35 U.S.C. 154(b) by 0 days.

(21) Appl. No.: 14/571,231

(22) Filed: Dec. 15, 2014

(65) Prior Publication Data

US 2016/0171358 A1 Jun. 16, 2016

(51) Int. Cl.
*G06K 19/06* (2006.01)
*G06K 19/02* (2006.01)
*B42D 25/36* (2014.01)

(52) U.S. Cl.
CPC ....... *G06K 19/06037* (2013.01); *B42D 25/36* (2014.10); *G06K 19/025* (2013.01); *G06K 19/06112* (2013.01)

(58) Field of Classification Search
USPC .................................. 235/494, 380, 451, 449
See application file for complete search history.

(56) References Cited

U.S. PATENT DOCUMENTS

| | | | |
|---|---|---|---|
| 2007/0062411 A1* | 3/2007 | Weisman et al. .......... | 106/31.15 |
| 2014/0209691 A1* | 7/2014 | Finn et al. .................... | 235/492 |
| 2014/0210200 A1* | 7/2014 | Bornschlegl et al. .......... | 283/85 |
| 2015/0028107 A1* | 1/2015 | Fischer et al. ................ | 235/488 |

* cited by examiner

*Primary Examiner* — Ahshik Kim
(74) *Attorney, Agent, or Firm* — Masuvalley & Partners

(57) ABSTRACT

The present invention is the security element for sensitive documents characterized in that it includes at least one graphene layer arranged on a polymer layer where the graphene layer is heterogeneous and forms a pattern characterized by different levels of absorption of electromagnetic radiation, especially infrared radiation, visible light radiation or ultraviolet light passing through the pattern at its various points.

7 Claims, 4 Drawing Sheets

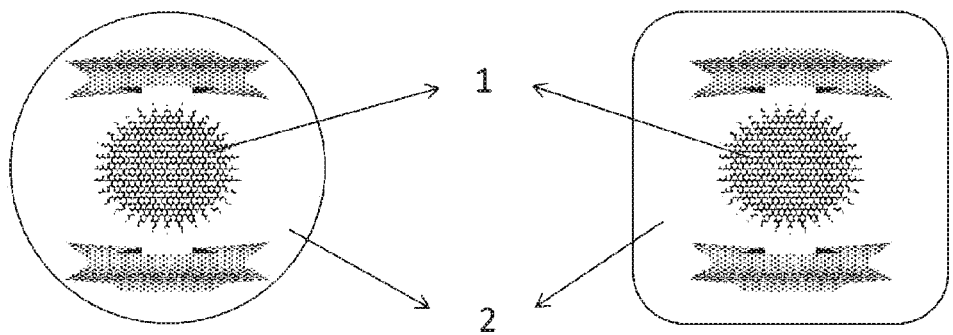
Fig. 1
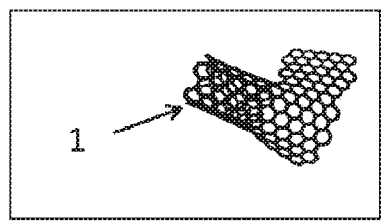
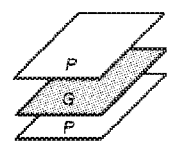
Fig. 2A
Fig. 2B
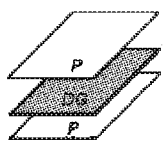
Fig. 2C
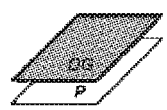
Fig. 2D

SECURITY ELEMENT FOR SENSITIVE DOCUMENTS AND A SENSITIVE DOCUMENT

RELATED APPLICATIONS

The present invention claims priority to European Patent Application No. EP 14460116.8 filed Dec. 10, 2014 entitled *Element zabezpieczajacy do dokumentów wrażliwych i dokument wrażliwy*, which is incorporated herein by reference in its entirety.

FIELD OF THE INVENTION

The present invention relates to a security element for sensitive documents comprising a layer of graphene disposed on a layer of polymer, wherein the graphene layer is heterogeneous and forms a pattern characterized by different levels of absorption of electromagnetic radiation, especially infrared radiation, visible light or UV radiation passing through the pattern in the different points.

The solution can be used in different types of proximity documents.

BRIEF DESCRIPTION OF THE DRAWINGS

The invention will now be further described in the preferred embodiments, with reference to the accompanying drawings, in which:

FIG. 1 Elements of the security chip;

FIG. 2A-2D illustrate types of flexible nanocomposite layer of the interface in accordance with the present invention, wherein FIG. 2A) a layer of graphene (two-dimensional or 3D structure e.g. nanotubes) exists between the two polymer layers with contact leads to the surface of one of the two polymer layers;

FIG. 2B) a layer of graphene (two-dimensional or 3D structure e.g. nanotubes) is "embedded" on the surface of a single layer of polymer;

FIG. 2C) a doped layer of graphene (two-dimensional or 3D structure e.g. nanotubes) exists between the two polymer layers with contact leads to the surface of one of the two polymer layers; or FIG. 2D) a doped layer of graphene (two-dimensional or 3D structure e.g. nanotubes) is "embedded" on the surface of a single layer of polymer;

Figure 3:
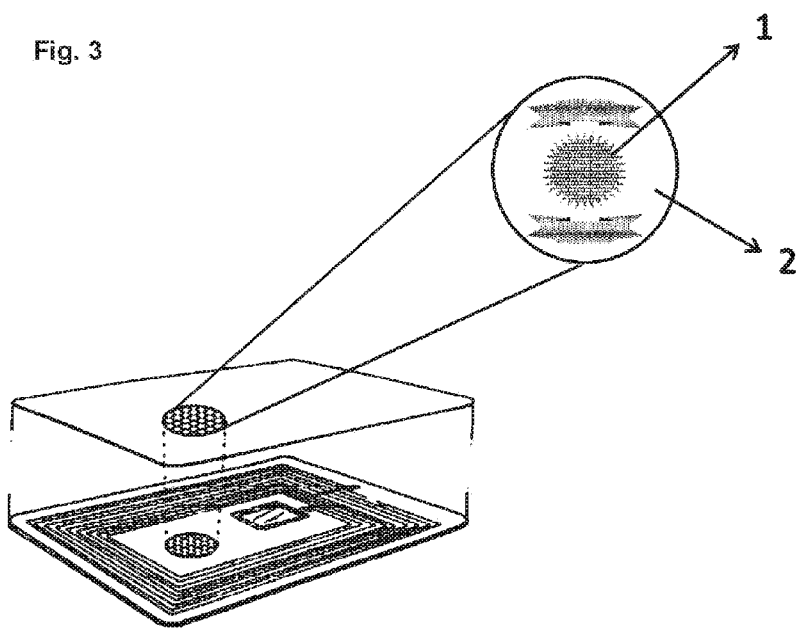
FIG. 3 illustrates an example of application of the security chip according to the present invention comprising an elastic graphene nanocomposite layer as an active graphene element in the proximity document like a card.
Figure 4:
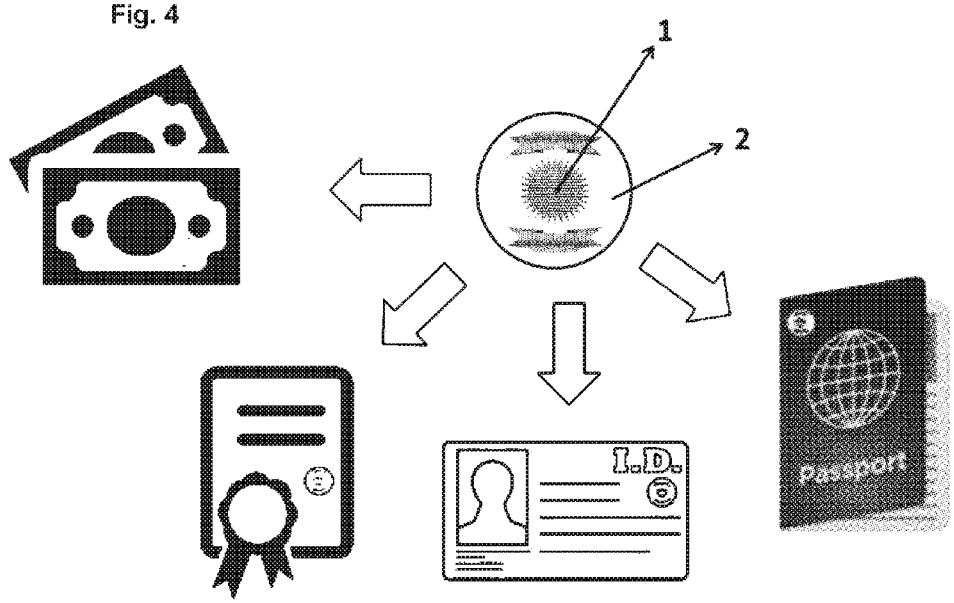
FIG. 4 illustrates examples of application of the security element according to the present invention.

Moreover, the figures use the following indications: 1—graphene layer of the active graphene element; 2—polymer; 3—detector; 4—the message confirming the document being genuine, and in FIG. 2 P is a polymer G—graphene and DG—doped graphene.

DETAILED DESCRIPTION OF THE PREFERRED EMBODIMENTS

The ease of forging is due to changes in the technology of the printing industry. The rapid development of digital printing causes both occasional and professional forgery to flourish. Effective protection against forgery must make it difficult to duplicate, simulate and forge a document. It must also be readily apparent ("to the naked eye") by the average user of a secured document, durable in use and recognizable for machinery and equipment. Its price should be reasonable and allow for integration with existing production processes.

It is worth noting that a forged document is most often prepared by a different method and with other materials than the original one. It mimics the original, so as to be accepted. Simulating can be minimized by giving a document a number of different features, so that the effort put into its counterfeiting becomes overwhelming. Counterfeiting becomes unprofitable, if it requires large investments.

The deterrent effect of a security should be based on the process, rather than on the structure of the product, because modern analytical methods make it easy to examine the structure of each thin-film product. Paper is a classic, and still used, base for multiple documents. For years, much attention is paid to its securities, constantly improving them.

Below is a brief overview of the security features of the prior art. The oldest and used to date are all kinds of watermarks, easy to implement during the production of paper and practically impossible to produce on the finished paper. Another technical element are opaque materials used for the execution of a document. Sometimes these additions can be used as markers in addition to the security functions. Covering materials with different additions, whose composition is secret of the producer and the user, are the most common security. They are often on the border of a security available (recognizable) for the average document user, and a security recognized by a special device. These include, for example special magnetic ink used in printing US banknotes. Their addition makes the notes stick to a strong magnet.

The use of optical coatings moving color (floating-point color) to protect against forgery of valuable documents: banknotes, stock exchange certificates, visas, passports, vehicle registration documents, etc. using color copiers or scanners and color printers was first proposed over 20 years ago. A filter to change the gold color to green color depending on the viewing angle was then used in Canadian banknotes. A thin film was applied to the notes using UV activated glue. Seeking protection against counterfeiting of US currency, Optical Coating Laboratory, Inc., (Santa Rosa, Calif.) also constructed a filter changing gold color to green, but different from the composition of the Canadian one. The next step was the emergence of an optically variable pigment, which is used in the production of optically variable ink. This ink does not have the drawbacks of a hot applied filter and it can be used like any other ink, both in rotogravure, as well as screen printing.

The optical effect depends on the angle, and is formed when white light is incident on a thin film having a thickness of a wavelength of visible light. The so called interference colors are formed then. The light beam incident on the thin film is reflected from the upper surface thereof, while a part of the beam penetrates into the material, wherein after refraction (by general laws of optics) it is reflected from the lower surface of the film and on upward return it interferes with the incident beam, giving the observer the illumination impression dependent on the viewing angle. Thin film illuminated with white light, for example, may show a change in color from red to blue, when the observer changes its position towards flattening of the angle of view. Looking at a smaller angle corresponds to the longer way through the layer or increasing the layer thickness accordingly. In the case of a number of thin films with different refractive indexes multiple reflection phenomenon occurs, and consequently you can get stronger, more defined colors interference.

Metallic-dielectric films are technically simpler and more convenient than to prepare than a purely dielectric film, because to improve the operation properties it is required to apply several layers. A symmetrical multi-layer structure was developed, so that after the formation of the thin film it can be separated from the carrier and transformed into a pigment. When such layered pigment is added to a polymeric carrier (paint matrix, ink, etc.), we obtain an optically variable ink. This ink changes color when viewed from different angles. Because toners in color copiers and printers do not have the properties of color changes depending on the viewing angle, optical shift reproduction is impossible.

Pigment structure consists of: interior metallic mirror, dielectric spacer layer and the layer of absorbent. A symmetrical structure is necessary, which has the same color on both sides, so that after printing on the document (paper) flakes oriented both "face down" and "face up", have the same color. Since the color change is mainly dependent on the thickness of the dielectric layer, the stability of one of the colors is identical with the second color stability. In addition, the colors are lightfast, since color formation takes place under the influence of light as a result of interference, and not absorption by the molecular structure of a chromophore. Thus, in such, optically interfering, pigments bleaching or fading is impossible. Today, optically variable inks are used worldwide. They are used for printing banknotes and other securities, both in rotogravure and screen printing.

Other methods of protecting documents is the use of technology, for example proximity technology, to perform some operations in the system that supports the selected documents, or the use of biometrics. This technology makes it possible to increase the level of security, but, just like the traditional methods, it cannot guarantee 100% effectiveness, mainly because of the pace of technological development in the field of IT.

With the current state of affairs, a combination of methods of traditional IT technology and materials technology using nano-materials is the optimal solution.

In the literature (EA 200 501 111 A1) a security element is known comprising a polypropylene polymer or polyvinyl chloride, which is applied to the adhesive layer in the form of a figure, or containing the optically variable pigment, or films, or holographic printing. The disadvantage of such solutions is that the security element is attached to a sensitive document using an adhesive layer, so there is always a risk of the security element peeling off the partly or wholly from said document.

However, in the publication US 20110266788 A1 a security element laminated in a sensitive document is shown, said security device comprising two parts. One of them is the HRI material, and the other, a primer, which may be polymeric.

The present invention proposes an alternate solution.

The aim of the present invention is to provide a new protection system, which includes a graphene-polymer layer based on flexible graphene nanocomposite, allowing to increase the effectiveness of anti-counterfeiting of sensitive documents.

According to the present invention, the security element for sensitive documents characterized in that it comprises at least one graphene layer arranged on a polymer layer wherein the graphene layer is heterogeneous and forms a pattern characterized by different levels of absorption of electromagnetic radiation, especially infrared radiation, visible light radiation or ultraviolet light passing through the pattern in its various points.

Preferably, it is a part of the surface of the document sensitive.

Preferably graphene layer is in a two-dimensional form having a thickness of one atom or more than one atom or three dimensional and preferably they are nanotubes arranged in different directions, in particular parallel or perpendicular to the surface of the polymer.

Preferably, the graphene in the graphene layer in its pure or doped form.

Preferably, the security element comprises two layers of polymer (2) between which the graphene layer (1) is arranged.

Preferably, said polymer layer is a polymer selected from the group consisting of polyethylene terephthalate (PET), polyethylene naphthalate (TEN), polyethersulfone (PES), and polycarbonate (PC), polypropylene (PP), poly(ethylene oxide) (PEO), poly(vinyl chloride) (PVC), synthetic rubber, most preferably: polyethersulfone (PES), polycarbonate (PC).

The invention further includes a sensitive document comprising such a security element.

Preferably, it is a credit card, a driving license, an ID card, various types of certificates, banknotes subject to special "high security" procedures.

Example 1—Security Chip

According to the present invention, the security chip is made based on the elastic layer of nanocomposite material 1 (FIG. 1).

The chip does not directly require a constant power source. But dedicated devices by which detection is carried out (checking the authenticity of the document) require it.

Security chip according to the technological modification is not limited by shape and size.

Flexible nanocomposite material 1 (FIGS. 2A-2D)—is a heterogeneous material structure composed of two or more components with different properties. The properties of the composites are not the sum or average of the properties of its components, and the material used in its construction exhibits anisotropy of physical properties.

One of the components is adhesive in this case, any polymer 2, in particular selected from the group consisting of polyethylene terephthalate (PET), polyethylene naphthalate (TEN), polyethersulfone (PES), and polycarbonate (PC), polypropylene (PP), poly(ethylene oxide) (PEO), poly(vinyl chloride) (PVC), synthetic rubber, and most preferably: polyethersulfone (PES), polycarbonate (PC), which guarantees the consistency, hardness, flexibility and resistance to compression, and the second is a monatomic layer of graphene, which provides conductive properties while maintaining the transparency of the material.

Graphene G has all the properties corresponding to the requirements of the production of nanocomposite material for a chip, for example
flexibility
high transparency The structure of the nanocomposite material security chip according to the invention involves:

using more layers of graphene in the material—the number of mononuclear layers depends on the conditions under which the security chip will operate.

use of graphene in the form of nanotubes, if the use of the properties of graphene, which is given by such construction are necessary to increase the effectiveness of the security chip.

doping of graphene to modify some properties of the material, e.g.: optical, electrical, electromagnetic or mechanical.

The properties of graphene fully meet the requirements for the creation of nanocomposite material, which is a major component of the security chip of the invention. However, one should not be limited to graphene only, if similar conditions are produced using other nanostructures.

According to the invention, the components of the nanocomposite layer of the security chip should be made in one of the selected ways:

a) a layer of graphene (two-dimensional or of a structure e.g. nanotubes) between two polymer layers with contact leads to the surface of one of the two polymer layers;

b) a layer of graphene (two-dimensional or 3D structure e.g. nanotubes) "embedded" on the surface of a single layer of polymer;

c) a doped layer of graphene (two-dimensional or of a structure e.g. nanotubes) exists between the two polymer layers with contact leads to the surface of one of the two polymer layers;

d) a doped layer of graphene (two-dimensional or of a structure e.g. nanotubes) "embedded" on the surface of a single layer of polymer.

The chip made with graphene technology can be completely transparent or in the case of the need to obtain visualization, it can have a form which is visible to the human eye.

At the outset of the design of graphene production process, the polymer which forms the substrate is to be considered. Depending on this, fixing graphene will occur at a variety of processes, for example by changing the physical state of the polymer under the influence of external factors such as temperature, solvents or adhesives or gels of linking properties, etc., allowing to join the layer of polymer and graphene into a single structure.

The Principle of Operation of the Security Chip

The essence of the solution according to the invention is the construction and method of detection of an element containing nanomaterials, allowing control of a document in which such an element was placed.

The effect of detection can be:

confirmation of the original document by using a dedicated detector and/or devices connected to it, for example displaying and recording the result in a dedicated application on a smartphone screen, authorization of a card at an ATM when making banking operations.

The security element has a designed unique image (shape). This shape is applied in the production process on the transparent polymer substrate 2. The process of applying the layer of a nanocomposite is compatible with the application methods for the corresponding polymers. The security element is then placed in accordance with the rules of the production process in a document for protection against counterfeiting.

Figure 5:
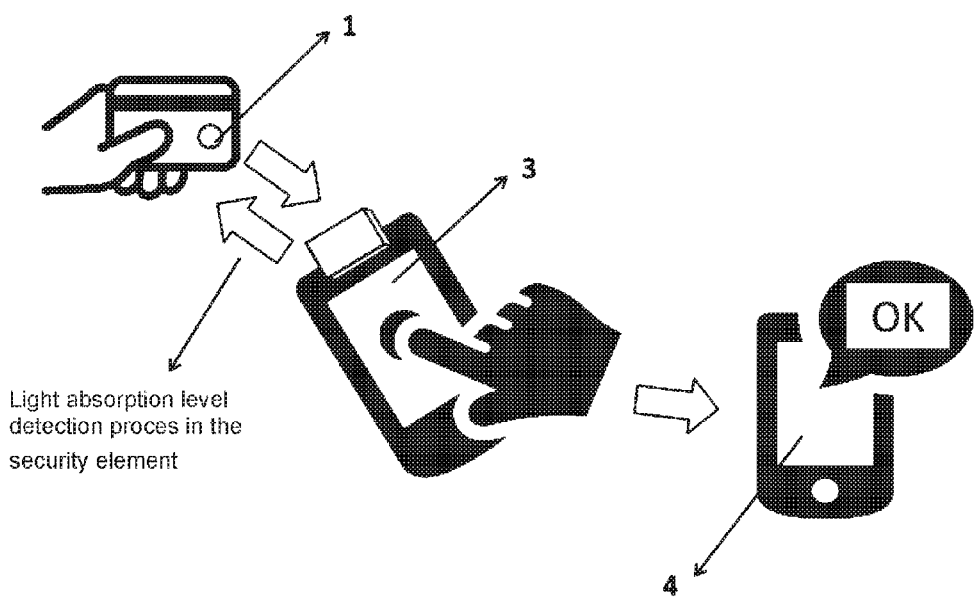
FIG. 5 illustrates the principle of the security chip communication with the control unit.
Figure 6:
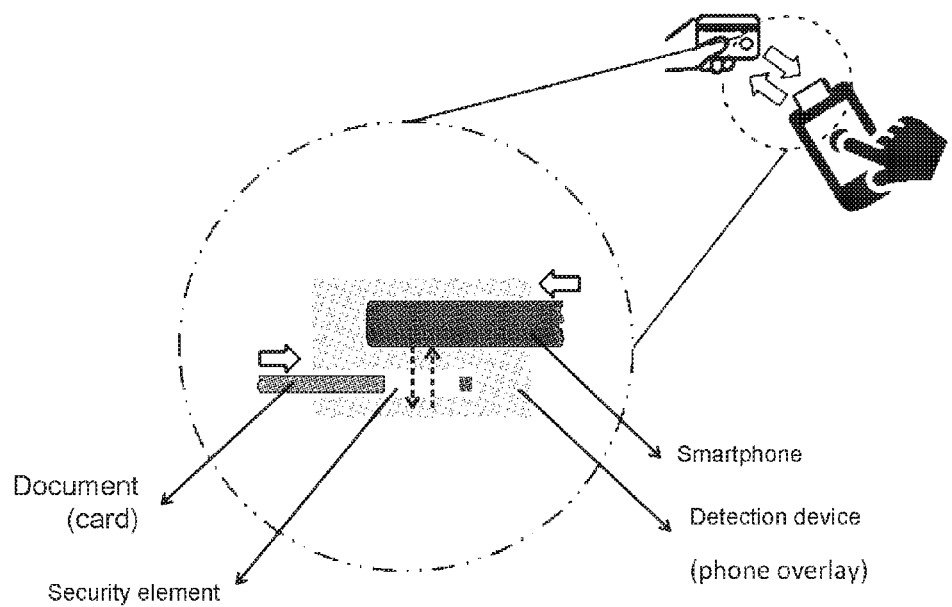
FIG. 6 illustrates the detection of the level of light absorption in the security element by means of a control device (phone overlay) and a smartphone.

The detection of an element arranged in the document occurs using a detector 3, for example the level of absorption of light passed through the security element. Placing the element in the operation field of the detector 3, and running it (FIG. 5), will trigger the steps of light absorption measurement in a given area. Depending on the nanocomponent, e.g. a limit value for graphene will absorb 2.3% of the radiation incident on the security element. The detector will measure the differences, and then compare them with the stored pattern. Compliance or difference in the comparative analysis will create the appropriate system message 4. In particular—compliance will result in a message on the authenticity of the document, and difference will give a message on its absence.

Only the use of a detector operating on the basis other than the measurement of light absorption is acceptable, for example using analytical techniques such as mass spectrometry.

An important feature is the ability to implement the element on the surface of any document.

Figure 7:
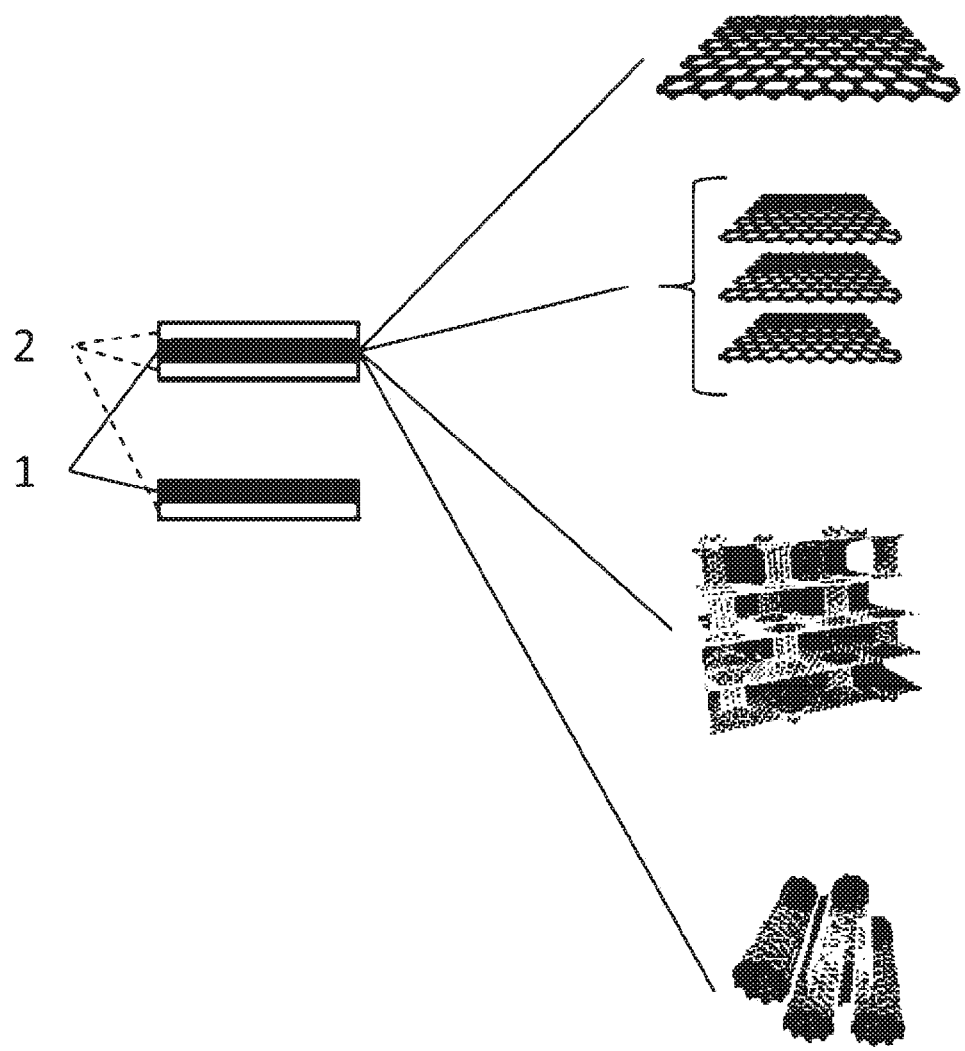
FIG. 7 illustrates examples of the arrangement of graphene layers in the nanocomponent comprising an elastic graphene nanocomposite layer, according to the present invention.

Depending on the design, the arrangement of graphene in the nanocomposite structure of the switch according to the invention can take any form that can achieve maximum performance of the security chip during its use. Examples of arrangement of conductive structures in nanocomposite are illustrated in FIG. 7.

Characteristics:

The security element with a composite material is resistant to:

moisture and condensation splashing water-damage corrosion ultraviolet dust constant magnetic field changes in temperature in the range −40° C. to +70° C.

Advantages of the present invention are: the ability to control the time of operation using the document, making authorization or transaction by the owner of the document only, maintaining the nature of the proximity document, even after the invention has been implemented, to increase safety standards as compared to the ones currently used, e.g. such as traditional holograms. For proximity documents—mechanical blocking access in crime of any unauthorized use or copying of the document.

Detection method described in the present invention allows for the safe use of the documents only at the time of the transaction in the case of credit cards, or secure authorization of the owner's identity together with other security methods in the case of other documents.

Example 2—Application of the Security Chip According to the Invention

The applicability of the security chip of the present invention is limited only by the invention of the microprocessor-based proximity documents. An example application would be:

biometric passports—the chip is an integral part of the cover;

payment cards—the top layer of the card;

other documents in the form of a payment card, such as a driving license, ID card;

paper pre-numbered forms, such as: certificates, banknotes subject to special "high security" procedures.

The solution according to the invention illustrated in the embodiment in which the document is a proximity card in RFID technology, and also containing other security measures.

Due to the tightness of the access to the production technology of graphene within the next few years documents with the invention will have the highest standard of safety.

What is claimed is:

1. A security element for a document, comprising: a nanocomposite layer comprising at least one graphene layer fixed to a polymer layer, wherein the graphene layer is heterogenous, and forms a pattern characterized by a plurality of different levels of absorption of electromagnetic radiation, the electromagnetic radiation selected from a group consisting of: an infrared radiation, a visible light, and an ultraviolet radiation.

2. The security element according to claim 1, wherein the security element is part of a surface of the document.

3. The security element according to claim 1, wherein the graphene layer is two-dimensional with a thickness of one atom or more than one atom or three dimensional and preferably the graphene layer comprises a multiplicity of nanotubes arranged in a plurality of different directions, including parallel or perpendicular to a surface of the polymer.

4. The security element according to claim 1, wherein the graphene in the graphene layer is in a pure or a doped form.

5. The security element according to claim 1, wherein the security element comprises at least two layers of the polymer between which the graphene layer is arranged.

6. The security element according to claim 1, wherein the polymer layer is selected from the group of polymers consisting of: a polyethylene terephthalate (PET), a polyethylene naphthalate (TEN), a polyethersulfone (PES), and a polycarbonate (PC), a polypropylene (PP), a poly(ethylene oxide) (PEO), a poly(vinyl chloride) (PVC), a synthetic rubber, a polyethersulfone (PES), and a polycarbonate (PC).

7. A security element of claim 1, wherein the security element is included in a document, the document selected from a group consisting of:

a credit card, a driving license, an ID card, a certificate, a banknote and a registration certificate.

* * * * *